Patented Dec. 30, 1930

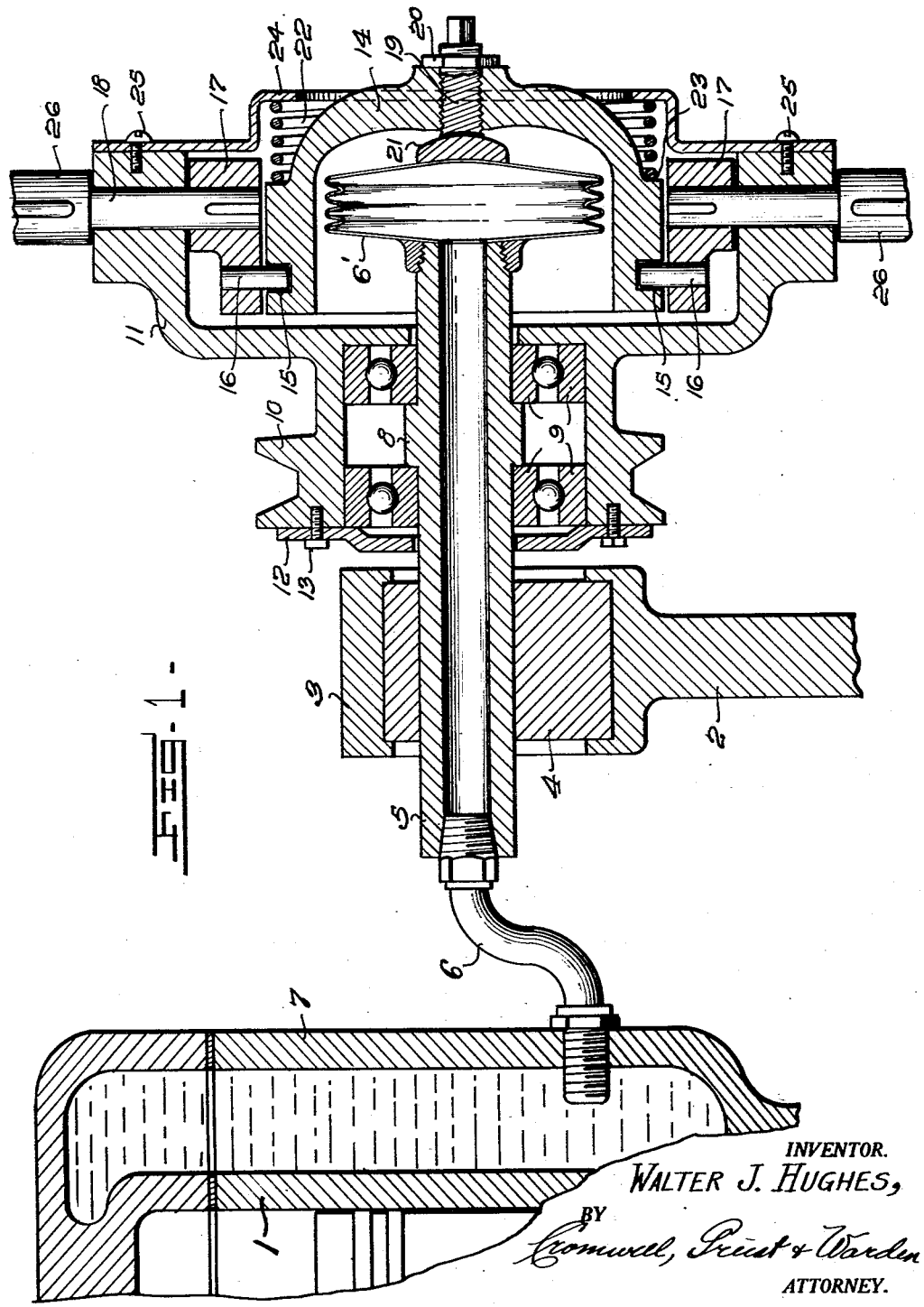

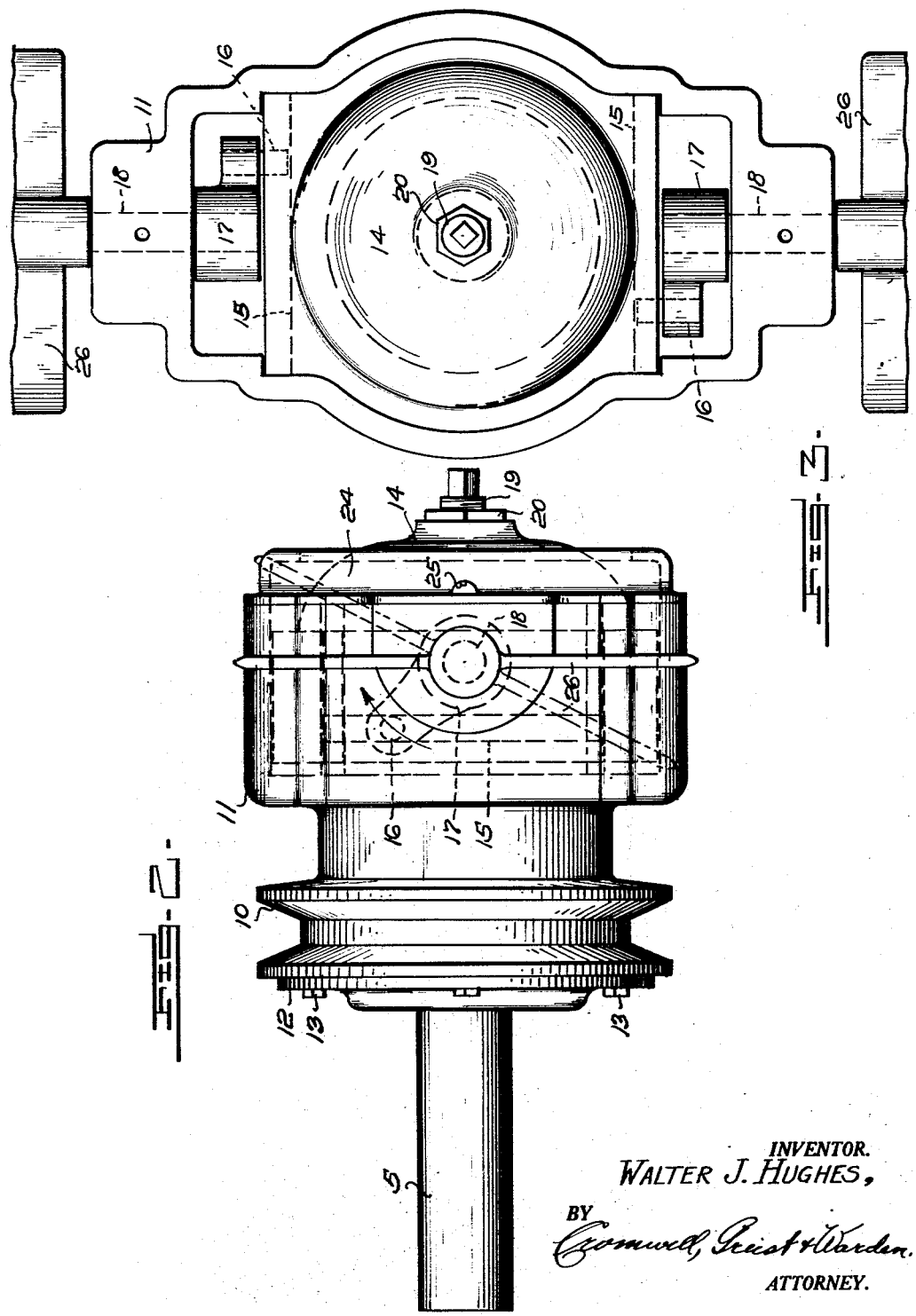

1,787,041

UNITED STATES PATENT OFFICE

WALTER J. HUGHES, OF CHICAGO, ILLINOIS

THERMOSTAT-CONTROLLED FAN

Application filed February 28, 1929. Serial No. 343,479.

My invention, forming the subject matter of this specification, relates generally to automatically controlled cooling fans, and more especially to the use of such devices for motor vehicle or other radiator controlled structures.

The most satisfactory operating condition for an internal combustion engine depends upon control of the heating characteristics of the engine, both under starting and running periods. In starting such devices when cold, it is advisable that the motor be brought to its most efficient operating temperaure as quickly as possible and be mainained at such operating temperature while the motor is running, irrespective of load conditions.

In the cooling system of motor vehicles, a fan is generally employed to induce the air flow through a water-cooled radiator and past the engine. These fans are arranged between the radiator and the engine and are driven by some suitable power transmission connection with the shaft of the motor, the rotational speed of the fan varying with the speed of the engine. It is not, however, desirable to have flowing through the radiator at all times, the maximum amount of air which the cooling fan will move. This is particularly the case while the motor first begins to operate and until the motor reaches the advantageous heat conditions. It is likewise desirable to increase the air flow during operating periods which entail abnormal heating of the engine.

My invention contemplates automatic control of the fan exclusively, dependent on the temperature of the device to be cooled. In carrying my invention into effect, I make use of a fan structure having feathering blades and thermostatic control means embodied therewith, the control means being shielded from the influence of the air flowing past the fan, and having a direct connection with the engine. The thermostat embodies an expansible element located within the fan with connection between the expansible member and the engine. The expansible member and connections with the motor form a closed vessel which is filled with volatile liquid, and due to direct connection with the motor and the fan, is practically responsive only to change of heat conditions of the engine.

Among the objects of my invention is the production of a structural organization automatically responsive to changing temperatures of the device to be cooled, and a structure which does not require additional space for use with existing engine applications.

A further object of the invention is the provision of a thermostatically-controlled fan structure in which the thermostat is shielded from the influence of passing air currents, and one in which the fan is directly associated with the thermostat without the employment of a clutch or other power transmission release mechanism.

A further object of the invention is the production of a compact structural organization easy to make and assemble and which may be mounted in adjustable relation with respect to the engine.

My invention is applicable to many kinds of apparatus, and is hereinafter disclosed for purposes of illustration by the specification and drawings forming a part thereof, in a preferred embodiment in conjunction with an internal combustion engine.

In the drawings, wherein like reference numerals designate corresponding parts throughout the several figures,—

Figure 1 is a detail sectional view of the invention as applied to an internal combustion engine of a motor vehicle, only a part of the cylinder block and water jacket of the engine being shown;

Fig. 2 is a top plan view of the fan structure and supporting shaft; and

Fig. 3 is a front elevation of the device shown in Fig. 1, with the front cover plate and retaining member removed.

Referring to Fig. 1 of the drawing, 1 represents the cylinder block of a motor vehicle engine, and 7 the water-cooling jacket of the engine. 2 is a fan support bracket suitably arranged in conjunction with the engine, the support having a clamp 3 at the upper end supporting a block 4 which is eccentrically apertured to receive and support a hollow fan shaft 5 in parallel spaced relation to the engine shaft. The block 4 is adjustably positioned within the clamp to provide an eccentric adjustment whereby the fan shaft may be bodily moved with respect to the engine to increase or decrease, within limits of the eccentric, the distance between the fan shaft and the motor shaft referred to above.

The hollow shaft 5 has one end extending through the block 4, and a flexible conduit 6 with suitable fluid-tight connections joins the end of the shaft with the water jacket of the engine, which constitutes a source of heat. An expansible bellows type thermostatic element 6' is attached to the other end of the shaft and forms, with the hollow shaft and conduit connection with the engine, a hollow vessel which is filled with a suitable volatile liquid responsive to varying heat conditions of the motor. The shaft 5 is provided intermediate its ends with an enlarged portion 8 on opposite sides of which are mounted anti-friction bearings 9 having positioned on the outer races thereof a combined pulley sheave 10 and fan hub housing or casing 11. The combined pulley sheave and housing is formed to receive the bearings therewithin and has an inwardly-directed annular flange portion forming a stop engaging one of the bearings. An annular cover plate 12 acting also as a bearing retainer is attached to the face of the sheave portion 10 by the screws or other suitable fastening means 13, so that the cover plate, the pulley sheave and housing, shaft and bearing assembly, fix the relative position of the parts and define the plane of rotation of the combined sheave and housing.

A plurality of radially pivoted stub shafts 18, carrying fan blades 26 on their outer ends, are journaled in the housing with the inner ends of the shafts extending through and disposed within the housing. The housing also holds and guides therewithin, in telescoping relation, a movable shield and fan blade actuating member 14 having cross grooves 15 receiving for movement therein pins 16 of cranks 17, the cranks being fixed to the inner ends of the fan blade shaft. The cranks and pins are located between the inner surface of the fan housing and the outer surface of the actuating member, so that a movement of the actuating member parallel with the hollow shaft will cause a rotary movement of the fan blade shafts 18, and, in consequence, effect a change in the angular position of the fan blades.

To effect cooperation of the actuating member with the fan blades and the expansible thermostat element within the casing, the shield and actuating member 14 is fitted with the adjustment screw 19, which is held in any desired position of adjustment by the locknut 20. The inner end of the adjustment screw 19 serves as a bearing against the thrust bearing element 21 provided centrally on the forward end of the expansible thermostat element 6'. This bearing may be lubricated in any well known manner.

A spring 22 tends to hold the actuating member in the innermost position corresponding to the contracted position for the expansible element and to a feathering position for the fan blades, the spring being retained between a shoulder 23 formed on the member 14 and a cover plate and retainer 24 fixed to the fan housing by screws or bolts 25. The cover plate extends inwardly in overlapping relation with the combined shield and actuating member.

With the foregoing structural relation, it will be apparent that upon expansion of the thermostat element 6', the fan blades will be moved from a feathering position to an air-moving angular position, dependent on the degree of expansion of the thermostat. Conversely, when the thermostat contracts, the fan blades will be returned to feathering position, as indicated in full lines on Fig. 2, by the influence of the spring 22.

The operating parts of the structure described are all confined within the overall limits of the pulley sheave and fan hub housing which, with the cooperating shield and actuating member, forms a compact and complete enclosure for the expansible thermostat member and thereby shields it from air currents passing the fan. The entire disposition of the structure, including the hollow shaft and connections, is such that the thermostat is responsive only to the actual heat conditions of the engine, being practically uninfluenced by passing air currents.

The pulley sheave 10 is arranged for accommodation of the well known belt drive connection with the engine, the sheave and fan rotating whenever the engine is operated. The fan support shaft, being fixed by the adjustable eccentric block and support, permits adjustment of the whole fan structure for belt tightening purposes.

The operation of the device is as follows: The fan blades normally turn at right angles to the shaft and in feathering relation when the motor is cold. As the engine heat increases, the positive thermal connection with the engine expands the thermostatic element, which, through the structural connections described, changes the angle of the fan blades, causing the fan to move the air through which it turns. The angular disposition of the fan blades and the amount of air moved by the fan depends entirely on the temperature of the engine independent of the speed thereof.

In extremely cold weather when the engine more slowly attains proper heat characteristics, it will be obvious to those skilled in the art, that the fan will merely rotate in a feathering position until the engine begins to heat, and will only change its air moving capacity in response to actual heat conditions within the engine. This advantage of direct response to engine heat in an automatic fan, constantly rotating when the engine is running, gives control at all operating speeds of the engine and eliminates the necessity of radiator shutters and such shielding structures.

Modifications of the structure shown and described will be apparent to those skilled in the art, and the invention is not limited to the specific embodiment shown by the drawings, but the appended claims are intended as broadly commensurate with the scope of the invention without limitation to the specific features of construction described in the specification.

I claim:

1. The combination with an engine forming a source of heat, a fan, means including an eccentric for supporting the fan with respect to the engine, and means for automatically regulating the air moving capacity of the fan directly in response to the heat of the engine, said control means including a thermostat housed in the fan and directly connected with the engine.

2. The combination with an internal combustion engine, means for cooling the engine including a fan having movable blades, and means for automatically moving the blades of the fan, said last mentioned means including a thermal responsive member housed within the fan.

3. The combination with an internal combustion engine, means for cooling the engine including a fan having movable blades, and means for automatically moving the blades of the fan, said last mentioned means including an expansible thermostat housed by the fan and fluid connections between the thermostat and engine.

4. The combination with an internal combustion engine, means including an eccentric for supporting a fan for adjustment with respect to the engine, a hollow shaft, a hollow fan hub casing rotatably mounted on the shaft, a plurality of movable fan blades supported by the casing, and means for moving the fan blades including an actuating member telescoped within the fan hub casing and forming an enclosure therewith.

5. The combination with an internal combustion engine, means for supporting a fan for adjustment with respect to the engine, a hollow shaft, a hollow fan hub casing rotatably mounted on the shaft, a plurality of movable fan blades supported by the casing, means for moving the fan blades including an actuating member mounted within the fan hub casing and forming an enclosure therewith, and a thermostat mounted within the enclosure.

6. The combination with an internal combustion engine, a fan structure having feathering blades, means including an eccentric for supporting the fan structure for adjustment with respect to the engine, a hollow shaft, a flexible conduit connecting one end of the shaft and the engine, a thermostat fixed to the other end of the shaft and housed within the fan, and actuating means engaging the thermostat and fan blades whereby movement of the thermostat will tend to move the fan blades.

7. The combination with an internal combustion engine, a support including an eccentric, means for cooling the engine adjustably mounted in the supports, said means comprising a rotatable fan and a hollow shaft upon which the fan is mounted, a thermostat connected with one end of the shaft and housed within the fan, and a flexible conduit connecting the other end of the shaft with the engine.

8. In a thermostatically controlled cooling fan assembly for a motor vehicle, a hollow shaft, a combined pulley sheave and fan casing rotatably mounted on the shaft, movable fan blades supported by the casing, an expansible thermostat member in open communication with one end of the hollow shaft and housed within the fan casing, and means connecting the expansible thermostat with the fan blades for relative movement, said means including a shield for the thermostat telescoped within the fan casing.

9. In a cooling fan comprising a rotating hub casing, radially pivoted fan blade shafts journaled in the casing and extending within the same, cranks and pins mounted on the inner ends of the shafts, and an actuating member having transverse slots to receive the pins for movement therein, said actuating member telescoping within and forming with the hub casing an enclosure.

10. In a cooling fan structure comprising a hollow shaft, a combined pulley sheave and casing rotatably mounted on the shaft, movable fan blades supported by the casing, and means for moving the fan blades, said means including an expansible fluid thermostat located within the fan casing and fluid-tight connections including the hollow shaft extending from the thermostat for suitable connection with a source of heat.

11. In a fan for motor vehicles, a hollow fan hub casing, radially pivoted fan blades supported by shafts extending through the casing, a combined shield and actuating member within one end of the fan hub casing, said combined shield and member forming interconnection means between the fan blades.

12. In a fan for motor vehicles, a hollow shaft, a combined pulley sheave and fan hub casing rotatably mounted on the shaft, movable fan blades supported by the casing, and means for moving the fan blades including a closure member for the fan hub casing.

13. In a fan for motor vehicles, a hollow shaft, a combined pulley sheave and fan hub housing rotatably mounted on the shaft, movable fan blades supported by the casing, means for moving the fan blades including a closure member for the fan hub casing, and a thermal responsive element mounted on the shaft and housed by the closure member and housing.

14. A thermostatically controlled fan assembly comprising a hollow shaft having a flexible conduit forming fluid-tight connections with one end thereof, a thermal responsive element connected with the other end of the shaft, and a fan having feathering blades mounted on the shaft and providing a housing for the thermostat.

15. The combination with a device forming a source of heat, means for cooling said device including an air circulating fan, means for controlling the air capacity of the fan in response to varying temperatures of the device, said means including a thermal responsive element housed within the fan structure, and adjustable means for limiting the effect of the thermal responsive element.

16. The combination with a device forming a source of heat, means for cooling said device including an air circulating fan, means for controlling the air capacity of the fan in response to varying temperatures of the device, said means including a thermal responsive element housed within the fan structure, and adjustable means for causing operation of the thermal responsive element at predetermined elevated temperatres of the device to be cooled.

In testimony whereof I have hereunto subscribed my name.

WALTER J. HUGHES.